April 24, 1951 W. F. ROTHE 2,550,602
POTTED PLANT CONTAINER
Filed June 27, 1947
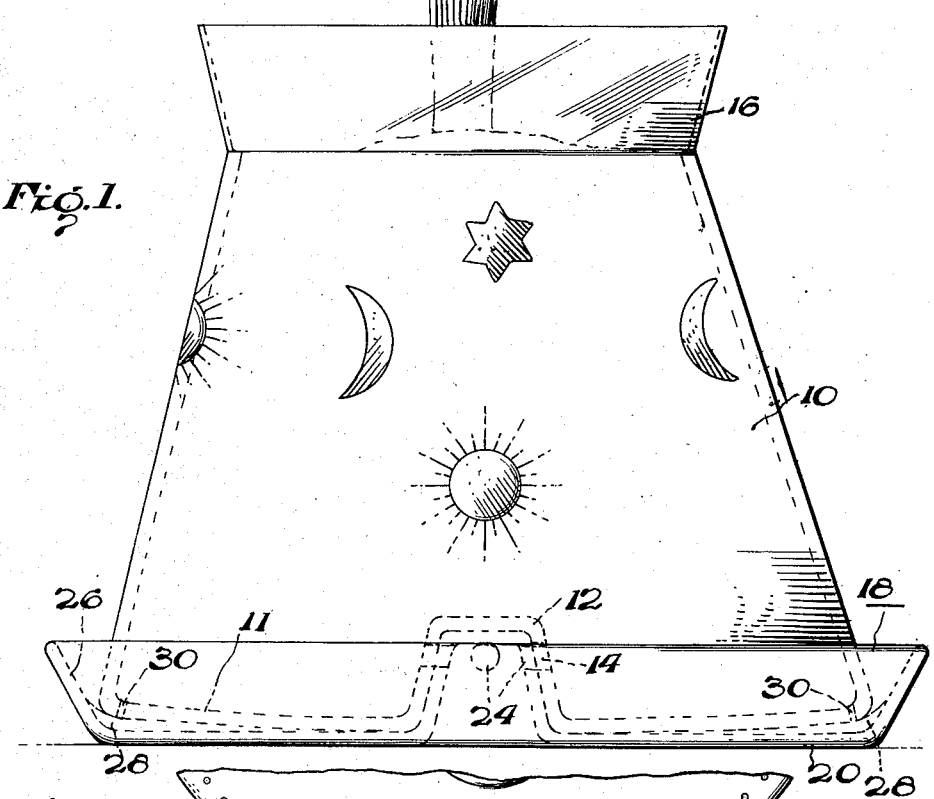
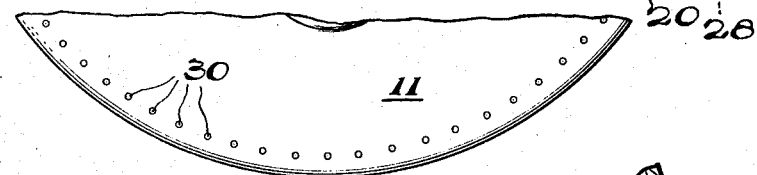
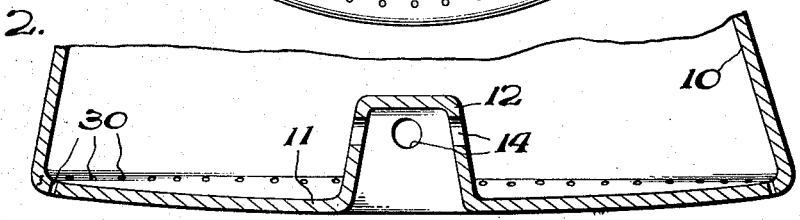
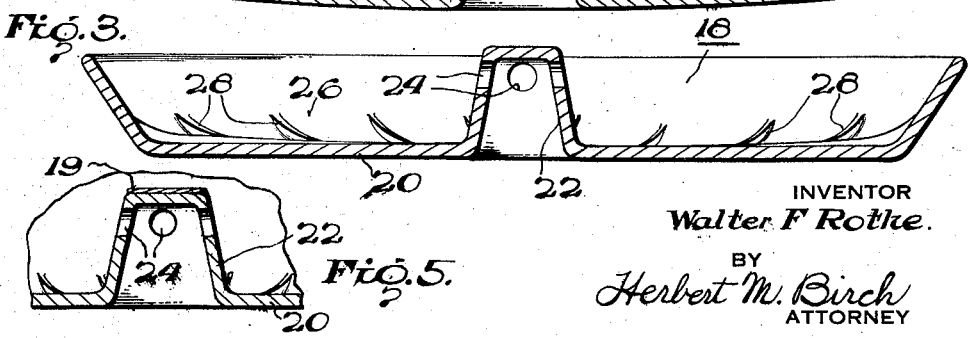
INVENTOR
Walter F Rothe.
BY
Herbert M. Birch
ATTORNEY Patented Apr. 24, 1951

2,550,602

UNITED STATES PATENT OFFICE 2,550,602

POTTED PLANT CONTAINER

Walter F. Rothe, Washington, D. C.

Application June 27, 1947, Serial No. 757,534

3 Claims. (Cl. 47—34)

The present invention relates to containers for growing potted plants.

Heretofore, containers for plants or flower pots have been made from semi-porous pottery or clay and shaped so as to gradually taper from the mouth of the container to a relatively smaller bottom portion. With these containers, the plants growing therein have their roots all tapering inwardly into a cramped tangled mass at the bottom of the container or flower pot. Such a condition is directly contra to the normal action of the roots of growing plants, which under normal conditions spread and fan out in all directions through the soil to pick as much nourishment therefrom as possible.

Also, the usual flower pots make no provision for proper regulation of irrigation, air supply and sunlight to provide for proper growth correlations of different varieties of plants so as to produce well developed and proportioned plants. For example, some plants require more moisture and some require less moisture but more air and light. Thus, it is known to obtain the most efficient results with potted plants, it is important to have containers which supply proper amounts of water, air and light. Accordingly, an object of this invention is to develop a plant container which may be regulated to supply approximately proper amounts of water, air and light to promote plant growth and development.

Another object is to provide a flower or plant container adapted to adjustably control a supply of air to the roots of the plant growing therein.

A further object is to provide a plant container so shaped and so proportioned as to encourage the normal spreading growth of the roots of the plant growing therein.

A further object is to provide in a plant container, the combination of an adjustable air supply, a water supply and light supply system for "potted plants."

Still another object is to provide an improved flower pot for growing plants formed from plastics having at least a portion of its body being of transparent material, such as glass or acrylic resins or the like, to admit light to the top of the soil around the plant.

The above and other objects and advantages of the present invention will appear more fully hereinafter from a consideration of the detailed description which follows, taken together with the accompanying drawings wherein one embodiment of the invention is illustrated. It is to be expressly understood however, that the drawings are for the purpose of illustration only and are not intended as a definition of the limits of the invention.

In the drawings, wherein like reference characters refer to like parts throughout the several views:

Fig. 1 is a side elevational view of one embodiment of the present invention assembled;

Fig. 2 is a cross sectional view of the irrigating portion or lower water holding bowl of the device;

Fig. 3 is a vertical cross sectional view of the plant and soil holding portion of the device;

Fig. 4 is a bottom plan view of the plant soil holding portion; and

Fig. 5 is a fragmentary cross-section view of the nipple portion of the water bowl showing a washer adapted to elevate the upper soil container to thus provide vertical adjustment.

Referring to the drawing in detail, there is shown a container 10 which is shaped like an inverted hollow cone having its larger portion at the bottom. This bottom portion is closed by a bottom surface 11 and is formed with a central upwardly projecting nipple 12. This nipple 12 is formed by pushing out the material of the bottom portion or molding the same in such a manner that it provides a conical hollow interior chamber with openings 14 which open to the interior of said chamber thus formed.

Secured to the upper rim portion of the container 10 is a collar 16 which flares outwardly from the top rim portion in a funnel-shaped manner. This collar 16 is made of transparent material, preferably of a plastic made from acrylic resins, or any other suitable material adapted to admit light to the surface of the soil which comes to the narrow portion at the top of the container 10. The container 10 may also be formed of a plastic but it is intended not to be transparent and is fused or molded to the collar 16 so as to form unitary structure. Any suitable design may be marked on the container 10, as shown on the drawings, to make the article more attractive. Also, the container may be formed of plastics of different colors but the collar 16, for the most part, is intended to be of transparent white substance.

The container 10 is adapted to rest in a lower bowl portion 18, which bowl has a larger circumference than the bottom portion 11 of the container. This bowl portion is provided with a bottom 20 which has a similar upwardly extending nipple 22 to that of the container. This nipple 22 is formed by pushing or molding the same from the material of the bottom, in a manner similar to that described in connection with the bottom of the container 10. The nipple 22 is provided with openings 24 corresponding to the openings 14 in the nipple 12 of the container 10. Thus, when the container 10 is mounted over the lower bowl 18, the nipples interengage or nest, one within the other, and the corresponding holes of each nipple may be registered with each other.

The purpose of the openings 14 and 24 is to provide means for admitting air into the soil confined within the container 10. This admission of air may be controlled by adjustment of one container with respect to the other, that is, by turning the container 10 to provide for greater or smaller registry of the openings with each other. Also, if desired, the containers may be turned relative to each other so that the openings are closed off completely, or, as shown in Fig. 5, vertical adjustment is possible by adding washers 19 to the top of the nipple 22. The bottom of the container 18 is concave from the center nipple portion to its side wall 26 and the concave bottom portion may be provided with spaced arcuate ribs 28, if desired. These ribs and the general shape of the bottom portion of the lower bowl 18 maintain the container 10 slightly elevated from the main bottom surface of the bowl, which bowl is usually maintained partially filled with water below the level of the air openings 14 and 24.

Around the bottom rim of the container 10, near its outer circumference, are a plurality of openings 30. These openings 30, due to the peculiar shape of the bottom bowl, are adapted to receive some of the water and thereby supply the necessary moisture to the soil in container 10.

Without further description, it is thought that the advantages and functions of the plant container should be apparent. However, to briefly summarize the several functions of the device, let us assume that there is a plant growing in the container 10, with its roots branching forth in all directions toward the bottom of the container. With this inverted funnel-shaped container, these roots are permitted to diverge outwardly as they grow toward the bottom of the container and thereby they do not become massed and entangled as in the usual flower pot, for example. The bottom bowl portion which mounts the container 10, is maintained partially full of water and feeds moisture up through the openings 30 to the soil around the roots of the plant. Simultaneously with the constant supply of moisture the collar 16 provides for the proper light to enter to the soil around the stem of the plant and also this collar 16 serves to prevent overflow of any watering which may be done from the top of plant. It is necessary on occasions to water the plant from the top in order to moisten the entire body of the soil.

Certain types of plants require considerable aeration of the soil for efficient growing results; while others need less air. Therefore, a system has been devised for providing aeration of the soil in varying degrees. Accordingly, when there is a plant growing in the container 10 requiring considerable air, the container 10 is rotated so as to fully register its openings 14 with the openings 24 of the lower bowl 18. With such an arrangement, air may enter under the container 10 which as previously stated, is slightly raised above the bottom 20 of the lower bowl through the registering openings and upward into the body of the soil in the container 10. On the other hand, when there is a plant growing in the container 10 requiring less air, a turning of the said container will reduce the amount of the registering openings 14 and 24 and thereby admit smaller quantities of air for supplying oxygen and nitrogen to the soil.

Thus, I have provided a novel plant growing system by the provision of a novel container combination, which is adapted to supply a maximum growing area for the roots of a plant, as well as a necessary quantity of light, air and water to promate and correlate the growth thereof.

While pottery or other porous material may be used to form the present invention containers, it is a decided advantage in most instances to use plastic to form the same, as plastic is less likely to break, and therefore, more economical for use in greenhouses where hundreds of pottery containers are constantly being broken.

Although one embodiment of my invention has been illustrated and described in detail, it is to be expressly understood that the same is not limited theerto, as various changes may be made in the design and arrangement of the parts illustrated, as will now appear to those skilled in the art. For a definition of the scope or limits of the invention, reference should be had to the appended claims.

What I claim is:

1. A container arrangement for irrigating and aerating growing plants, comprising a lower water holding container and an upper soil and plant holding container, a plurality of water feed openings formed in the bottom of the upper container and normally located below the water level of said lower container when the container is at least partially filled, a hollow nipple formed with a group of air feed openings extending upwardly from the bottom of said upper container, and a second hollow nipple formed with a similar group of air feed openings extending upwardly from the bottom of said lower container into the hollow bore of the first-mentioned nipple, whereby the said air openings of each nipple are registrable with each other in a plane above the water level in said lower container.

2. A container arrangement for irrigating and aerating growing plants, comprising a lower water holding container and an upper soil and plant holding container, a plurality of water feed openings formed in the bottom of the upper container and normally located below the water level of said lower container when the container is at least partially filled, a hollow nipple formed with a group of air feed openings extending upwardly from the bottom of said upper container, and a second hollow nipple formed with a similar group of air feed openings extending upwardly from the bottom of said lower container into the hollow bore of the first-mentioned nipple, whereby the said air openings of each nipple are registrable with each other in a plane above the water level in said lower container, and spaced rib members formed from the interior bottom surface of said water holding container adapted to maintain said water feed openings in said upper container elevated to provide for free feed of water therethrough into the said upper container.

3. A container arrangement for irrigating and aerating growing plants, comprising a lower water holding container and an upper soil and plant holding container, a plurality of water feed openings formed in the bottom of the upper container and normally located below the water level of said lower container when the container is at least partially filled, a hollow nipple formed with a group of air feed openings extending upwardly from the bottom of said upper container, a second hollow nipple formed with a similar group of air feed openings extending upwardly from the bottom of said lower container into the hollow bore of the first-mentioned nipple, whereby the said air openings of each nipple are registrable with each other in a plane above the water level in said lower container, and a washer member mounted between said nipples adapted to properly locate the air feed openings of each nipple.

WALTER F. ROTHE.

REFERENCES CITED

The following references are of record in the file of this patent:

UNITED STATES PATENTS

| Number | Name | Date |
|---|---|---|
| 296,028 | Martin | Apr. 1, 1884 |
| 1,710,878 | Kelso | Apr. 30, 1929 |
| 1,775,831 | Salisbury | Sept. 16, 1930 |
| 1,815,676 | Medveczky | July 21, 1931 |

FOREIGN PATENTS

| Number | Country | Date |
|---|---|---|
| 9,483 | Great Britain | 1884 |